Aug. 25, 1925.
C. E. MILNER
1,551,261
LUBRICATING APPARATUS
Filed July 3, 1923
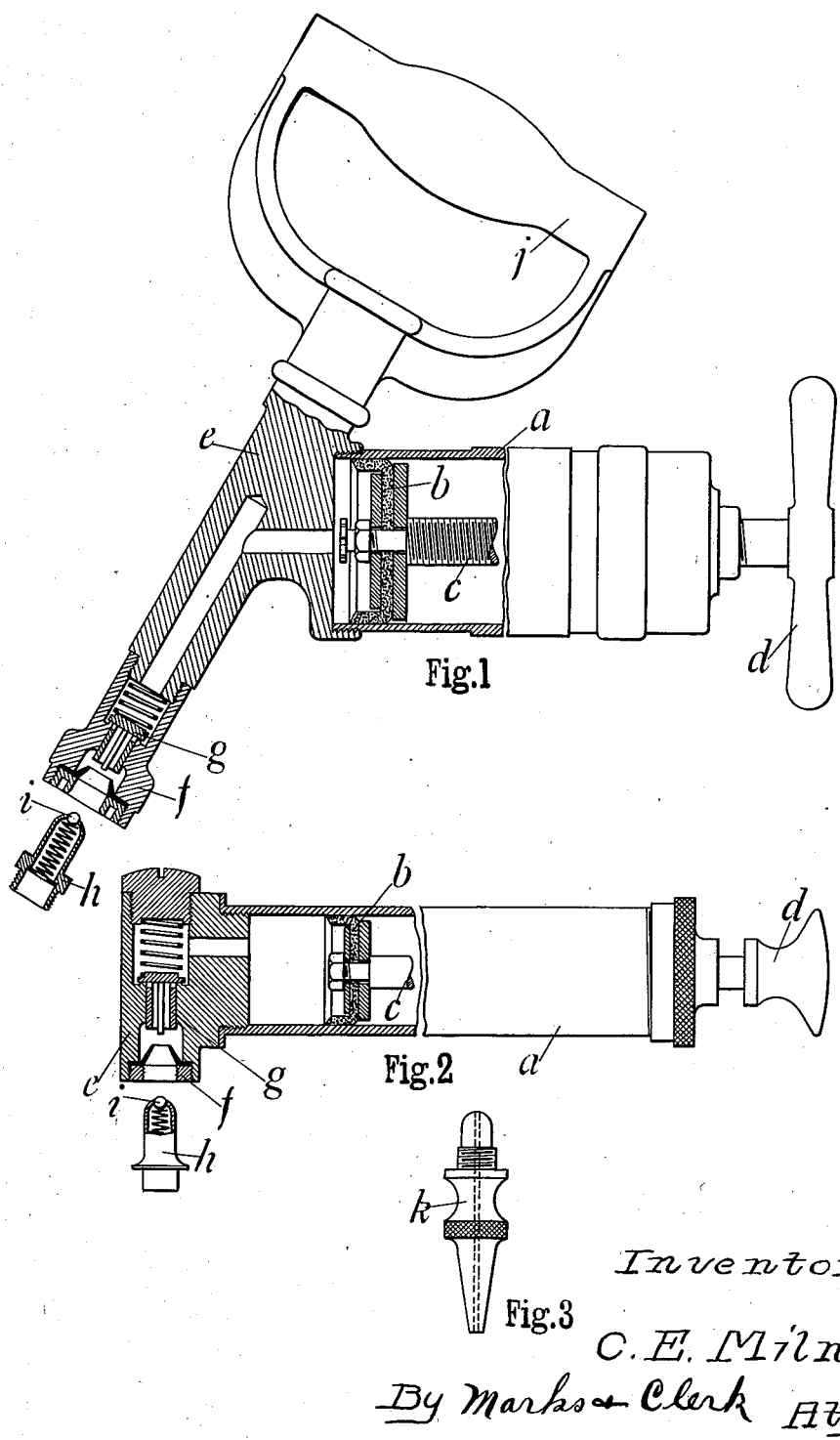
Inventor
C. E. Milner
By Marks & Clerk Attys.

Patented Aug. 25, 1925.

1,551,261

UNITED STATES PATENT OFFICE.

CHARLES ERIC MILNER, OF BIRMINGHAM, ENGLAND, ASSIGNOR TO BENTON & STONE LIMITED, OF BIRMINGHAM, ENGLAND.

LUBRICATING APPARATUS.

Application filed July 3, 1923. Serial No. 649,352.

*To all whom it may concern:*

Be it known that I, CHARLES ERIC MILNER, a British subject, residing at Bracebridge Street, in the city of Birmingham, England, have invented certain new and useful Improvements Relating to Lubricating Apparatus, of which the following is a specification.

This invention relates to lubricating apparatus of the kind known as "grease guns," in which lubricant is contained in a cylinder and is extruded into the bearing or other part to be lublicated under the pressure of a screw operated or other piston. Ordinarily a flexible pipe is used for effecting a detachable connection between the cylinder and a nipple on the part to be lubricated, the pipe being attached to the nipple by a screw or other mechanical coupling device. When it is desired to supply a quantity of lubricant to a number of different parts in succession, the necessary manipulation of the usual coupling device may sometimes be tedious and slow. For many purposes it is desirable to be able to effect the lubricating operation more expeditiously than has been possible hitherto.

The present invention comprises the combination with a cylinder containing a screw operated or other piston, of a rigid delivery branch fixed at a suitable angle to the cylinder and provided with a valve, the delivery end of the said branch being adapted to be forced against the nipple on the part to be lubricated by hand pressure sufficiently to open the valve and permit the required extrusion of lubricating material.

In the accompanying sheet of explanatory drawings:—

Figure 1 is a part sectional side elevation showing one form of lubricating apparatus constructed in accordance with this invention.

Figure 2 is a similar view showing an alternative form.

Figure 3 shows an additional nozzle which can be used with the apparatus illustrated in Figure 2.

Referring to Figure 1, a cylinder $a$ for containing the lubricant is fitted in the usual manner with a piston $b$ and a screw $c$, the latter passing through one end of the cylinder and terminating in an operating handle $d$. At the other end of the cylinder is secured a rigid delivery branch $e$ which is disposed at an angle to the cylinder, e. g. about 60°. One end of the branch is fitted with a nozzle $f$, containing a spring controlled valve $g$ which under axially directed pressure can be pressed off its seating to permit the required out flow of lubricant from the cylinder. For most purposes it is convenient to construct the nozzle to slip over a plain cylindrical nipple $h$ projecting from the part to which lubricant is to be applied, the outer end of the nipple containing a non-return ball valve $i$ which is pressed off its seating when the nozzle is applied to it. At the other end of the branch is provided a handle $j$ by which the user can apply a comparatively strong pressure in line with the axis of the nozzle and branch.

In use the lubricant is put under pressure by the screw operated piston in the cylinder, and after the nozzle has been slipped over the nipple pressure is applied to the handle. The resultant interaction of the nipple and the valve in the nozzle opens the valve and permits a quantity of lubricant to be delivered. On releasing the pressure on the handle the valve re-closes. The apparatus is then transferred to the next point, and the operation repeated. In this way the lubricating of a piece of machinery (such as a motor car) at a number of different points can be effected very expeditiously.

When dealing with fluid or slightly viscous lubricants the apparatus shown in Figure 1 can be simplified. In the form shown in Figure 2, for example, the handle is dispensed with, and instead of a screw actuated piston for ejecting the lubricant I employ a piston actuated by an ordinary sliding rod or plunger. The cylinder or container $a$ is fitted with a sliding piston $b$, and a piston rod $c$ passing through a cap or cover at one end of the cylinder, the piston rod being provided with a knob or handle $d$. The other end of the cylinder is closed by a screwed or other detachable cap which is formed integrally with a delivery branch $e$ containing a valve $g$ as in my previous apparatus. The axis of this branch is preferably arranged at right angles to the axis of the cylinder, and the delivery end is adapted to be slipped over the nipple $h$ in the part which is to receive the lubricant.

In use the forward end of the cylinder is grasped in one hand and the delivery end of the branch is pressed on to the nipple $h$.

The piston is actuated by the other hand for ejecting a quantity of lubricant. The pressure applied to the cylinder against the nipple serves to open the valve contained in the branch. On releasing the pressure the valve automatically recloses.

The same apparatus may be adapted for use as an ordinary oiler, by screwing or otherwise attaching a conical or other nipple or nozzle *k* (Figure 3) to the branch *e* so that the valve is pressed off its seating and oil is allowed to pass through the nipple when pressure is applied to the piston.

The invention is not limited to any particular mechanical or constructional details as these may be varied to suit different requirements.

Having thus described my invention what I claim as new and desire to secure by Letters Patent is:—

1. In lubricating apparatus, the combination comprising a cylinder for containing lubricant, a piston within the cylinder, a rigid delivery branch arranged at one end of the cylinder and inclined thereto, a handle in line with one end of the delivery branch, a valve within the other end of the said branch, and a nipple on to which the delivery branch can be pressed for opening the valve and allowing lubricant to pass from the cylinder to the nipple, substantially as described.

2. In a lubricating apparatus, a cylinder adapted to contain lubricant, lubricant ejecting means associated with the cylinder, a delivery branch for lubricant connected with the cylinder and extending in angular relation thereto, said delivery branch having a lubricant outlet at one end and a handle carried by the delivery branch opposite the lubricant outlet, the lubricant containing cylinder being connected with the delivery branch at a point intermediate the handle and the lubricant outlet.

In testimony whereof I have signed my name to this specification.

CHARLES ERIC MILNER.